(12) United States Patent
Wan et al.

(10) Patent No.: US 9,143,576 B2
(45) Date of Patent: Sep. 22, 2015

(54) MEDIA PROCESSING METHOD, DEVICE AND SYSTEM

(75) Inventors: Muyang Wan, Shenzhen (CN); Ruihua Li, Shenzhen (CN); Weiqin Wang, Shenzhen (CN); Weiteng Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 688 days.

(21) Appl. No.: 13/340,230

(22) Filed: Dec. 29, 2011

(65) Prior Publication Data

US 2012/0099672 A1  Apr. 26, 2012

Related U.S. Application Data

(63) Continuation of application No. PCT/CN2010/079545, filed on Dec. 8, 2010.

(30) Foreign Application Priority Data

Dec. 31, 2009 (CN) .......................... 2009 1 0238891

(51) Int. Cl.
*H04N 21/00* (2011.01)
*H04L 29/08* (2006.01)
*H04N 21/2343* (2011.01)
(Continued)

(52) U.S. Cl.
CPC .......... *H04L 67/2828* (2013.01); *H04L 65/602* (2013.01); *H04L 65/80* (2013.01); *H04N 21/2343* (2013.01); *H04N 21/23439* (2013.01);
(Continued)

(58) Field of Classification Search
CPC ................................................. H04N 21/2402

USPC ...................................................... 375/240.01
See application file for complete search history.

(56) References Cited

U.S. PATENT DOCUMENTS

2002/0144276 A1* 10/2002 Radford et al. ................. 725/87
2003/0046704 A1*  3/2003 Laksono et al. ................ 725/96
(Continued)

FOREIGN PATENT DOCUMENTS

CN  101068236 A  11/2007
CN  101242359 A   8/2008
(Continued)

OTHER PUBLICATIONS

Office Action issued in corresponding Chinese Patent Application No. 200910238891.3, mailed Apr. 1, 2013.
(Continued)

*Primary Examiner* — Sath V Perungavoor
*Assistant Examiner* — Jeffery Williams
(74) *Attorney, Agent, or Firm* — Brinks Gilson & Lione

(57) ABSTRACT

A streaming media processing method, device and system are disclosed in the embodiments of the present invention. The streaming media processing method includes: judging whether a transcoding is required according to the current bandwidth of a user terminal and a code rate of a pre-stored code stream, if yes, selecting a code stream of which the code rate is higher than the current bandwidth of the user terminal from the pre-stored code stream to perform the transcoding, and outputting the code stream matching the current bandwidth of the user terminal to the user terminal. The embodiments of the present invention enable the user terminal to obtain the streaming media of higher quality by effectively utilizing the bandwidth.

6 Claims, 11 Drawing Sheets

(51) Int. Cl.
*H04N 21/24* (2011.01)
*H04L 29/06* (2006.01)

(52) U.S. Cl.
CPC ... *H04N 21/234336* (2013.01); *H04N 21/2402* (2013.01)

(56) References Cited

U.S. PATENT DOCUMENTS

| | | |
|---|---|---|
| 2006/0123126 A1 | 6/2006 | Kim et al. |
| 2006/0168323 A1 | 7/2006 | Kim et al. |
| 2006/0198392 A1 | 9/2006 | Park et al. |
| 2008/0071920 A1 | 3/2008 | Gupta et al. |
| 2008/0086570 A1 | 4/2008 | Dey et al. |
| 2008/0205389 A1* | 8/2008 | Fang et al. .............. 370/389 |
| 2009/0043906 A1 | 2/2009 | Hurst et al. |
| 2009/0216897 A1 | 8/2009 | Wang |

FOREIGN PATENT DOCUMENTS

| | | |
|---|---|---|
| CN | 101272479 A | 9/2008 |
| CN | 101511010 A | 8/2009 |
| CN | 101640627 A | 2/2010 |
| CN | 101778104 A | 7/2010 |

OTHER PUBLICATIONS

International Search Report issued in corresponding PCT Patent Application No. PCT/CN2010/079545, mailed Mar. 24, 2011.
Written Opinion of the International Searching Authority issued in corresponding PCT Patent Application No. PCT/CN2010/079545, mailed Mar. 24, 2011.
Extended European Search Report issued in corresponding European Patent Application No. 10840483.1, mailed Jun. 4, 2012.
Lim et al., "An Optimal Adaption Framework for Streaming Multiple Video Objects" IEEE Transactions on Circuits and Systems for Video Technology, vol. 18, No. 5, May 2008.
Birney, "Intelligent Streaming" Jumpstart 4, Windows Media, Microsoft, Nov. 19, 1999. XP-002177089.

* cited by examiner

|  | Slice 1 | Slice 2 | Slice 3 | Slice 4 | Code Rate and Resolution |
|---|---|---|---|---|---|
| Code Stream 1 | 11 | 12 | 13 | 14 | 400*200  15Mbps |
| Code Stream 2 | 21 | 22 | 23 | 24 | 400*200  8Mbps |
| Code Stream 3 | 31 | 32 | 33 | 34 | 200*100  3Mbps |
| Code Stream 4 | 41 | 42 | 43 | 44 | 200*100  1.5Mbps |
| Code Stream 5 | 51 | 52 | 53 | 54 | 200*100  1Mbps |
| Code Stream 6 | 61 | 62 | 63 | 64 | 100*50  0.8Mbps |
| Code Stream 7 | 71 | 72 | 73 | 74 | 100*50  0.5Mbps |

Fig. 5

MEDIA PROCESSING METHOD, DEVICE AND SYSTEM

CROSS-REFERENCE TO RELATED APPLICATIONS

This application is a continuation of International Application No. PCT/CN2010/079545, filed on Dec. 8, 2010, which claims priority to Chinese Patent Application No. 200910238891.3, filed on Dec. 31, 2009, both of which are hereby incorporated by reference in their entireties.

FILED OF THE INVENTION

The present invention relates to the field of communication, and particularly, to a streaming media processing method, device and system.

BACKGROUND OF THE INVENTION

With the improvement of the network technique, the streaming media service is developed rapidly. The users can access a wired or wireless network with a terminal device such as cell phone, computer, television, etc. to enjoy audio and video services. The bandwidth of the accessed network varies with the type of the accessed network, e.g., the GSM usually can only provide a bandwidth of several tens of Kb, while the WIFI can provide a bandwidth of several tens of Mb. Even in the same network, the bandwidth varies with the time, especially in the wireless network. The higher the network bandwidth is, the better the provided video quality is, so it is a problem for the streaming media service provider to provide the best video experience under a variable bandwidth.

Referring to FIG. 1, which illustrates an implementation solution of the prior art, in which, the code stream storage server stores the code streams of multiple code rates in each streaming media program, and each code stream is segmented into different slices at a fixed time interval (e.g., 2 s) to act as the basic unit of streaming media transmission, as illustrated in FIG. 2.

The streaming server in FIG. 1 is configured to detect the access bandwidth of the user terminal, and then select a code stream slice optimally matching the bandwidth of the user terminal from the code stream storage server to transmit to the user terminal. For example, the code stream storage server stores the pre-compressed code stream slices of 0.5 Mbps, 1 Mbps and 2 Mbps, wherein the code stream slice of 1 Mbps is transmitted when the access bandwidth of the user terminal is 1.8 Mbps, and the code stream slice of 2 Mbps is transmitted when the access bandwidth of the user terminal changes to 2.1 Mbps. The code rates are switched in a basic unit of slice, i.e., when the current code stream is slice 12 of code stream 1, if a bandwidth change is detected during the transmission of slice 12 and a switching to slice 23 of code stream 2 is required, the switching shall be made after slice 12 is ended.

During the implementation of the present invention, the inventor finds that the prior art at least has the following defect:

The streaming server can only select a code stream optimally matching the user terminal according to the bandwidth of the user terminal to transmit to the user terminal, thus there is the defect that the user bandwidth cannot be sufficiently utilized to provide a streaming media of the best quality. For example, when the user bandwidth is 1.8 Mbps, the streaming server can only select the code stream slice of 1 Mbps, thus the user bandwidth of 1.8 Mbps cannot be sufficiently utilized.

SUMMARY OF THE INVENTION

The embodiments of the present invention provide a streaming media processing method, device and system, so that the user terminal can effectively utilize the bandwidth to obtain a streaming media of higher quality.

In which, a streaming media processing method includes:

judging whether a transcoding is required according to the current bandwidth of a user terminal and a code rate of a pre-stored code stream; and if yes, selecting a code stream of which the code rate is higher than the current bandwidth of the user terminal from the pre-stored code stream to perform the transcoding, and outputting the code stream matching the current bandwidth of the user terminal to the user terminal.

In which, a streaming media processing device includes:

an acquiring unit configured to acquire the current bandwidth of a user terminal;

a transcoding control unit configured to judge whether a transcoding is required according to the current bandwidth of the user terminal and a code rate of a pre-stored code stream; and a service processing unit configured to receive, when the transcoding control unit judges that the transcoding is required, a code stream matching the current bandwidth of the user terminal obtained by selecting the code stream of which the code rate is higher than the current bandwidth of the user terminal from the pre-stored code stream to perform the transcoding, and output to the user terminal.

In which, a streaming media processing system includes:

an acquiring unit configured to acquire the current bandwidth of a user terminal;

a code stream storage unit configured to store a code stream of streaming media;

a transcoding control unit configured to judge whether a transcoding is required according to the current bandwidth of the user terminal and the code rate of the code stream pre-stored by the code stream storage unit;

a transcoding unit configured to select, when the transcoding control unit judges that the transcoding is required, the code stream of which the code rate is higher than the current bandwidth of the user terminal from the pre-stored code stream to perform the transcoding, and output the code stream matching the current bandwidth of the user terminal; and a service processing unit configured to output the code stream output from the transcoding unit to the user terminal.

The above technical solutions have the following advantage.

Whether to perform the transcoding is judged according to the current bandwidth of the user terminal and the code rate of the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiments of the present invention enable the user terminal to obtain the streaming media of higher quality by effectively utilizing the bandwidth.

BRIEF DESCRIPTION OF THE DRAWINGS

In order to more clearly describe the technical solutions of the embodiments of the present invention, the drawings to be used in the descriptions of the embodiments or the prior art are briefly introduced as follows. Obviously, the following drawings just illustrate some embodiments of the present invention, and a person skilled in the art can obtain other drawings from these drawings without paying any creative effort.

FIG. 5 is a schematic diagram of a pre-stored code stream according to Embodiment 2 of the present invention;

DETAILED DESCRIPTION OF THE EMBODIMENTS

In order to make the object, technical solutions and advantages of the present invention be clearer, the present invention is further described in details through the following embodiments and relevant drawings.

Embodiment 1

Figure 1:
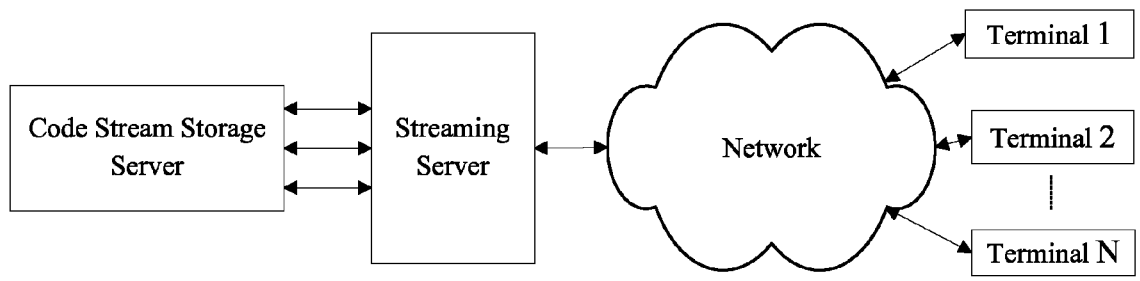
FIG. 1 is a structural diagram of a streaming media system in the prior art.
Figure 2:
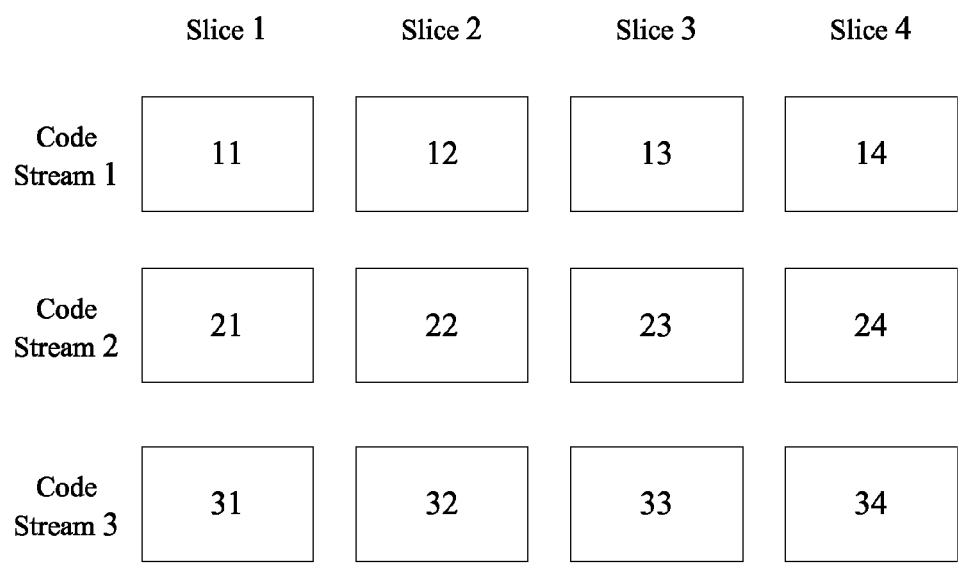
FIG. 2 is a schematic diagram of slices of a pre-stored code stream in the prior art.
Figure 3:
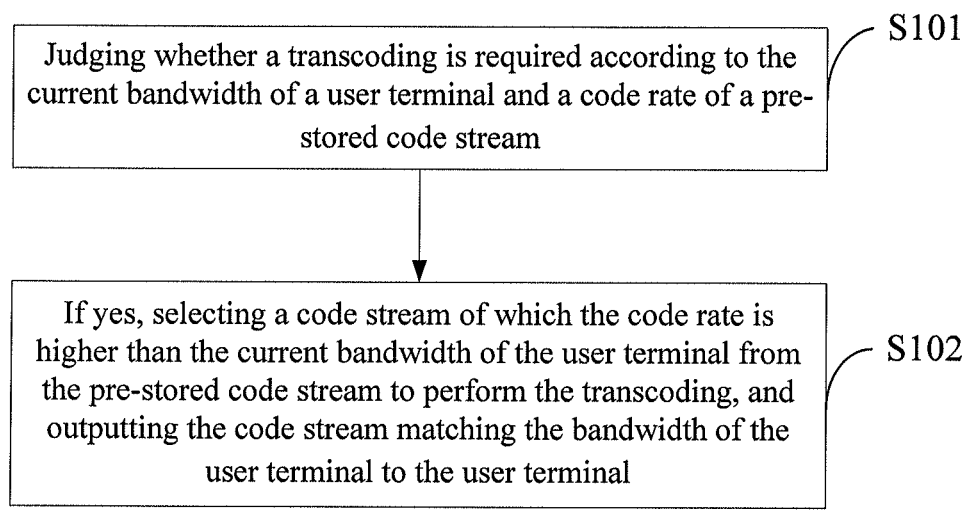
FIG. 3 is a flowchart of a streaming media processing method according to Embodiment 1 of the present invention.

Embodiment 1 of the present invention provides a streaming media processing method for sufficiently utilizing the user bandwidth to output a code stream of higher quality. Referring to FIG. 3, the streaming media processing method includes:

S101: judging whether a transcoding is required according to the current bandwidth of a user terminal and a code rate of a pre-stored code stream;

S102: if yes, selecting a code stream of which the code rate is higher than the current bandwidth of the user terminal from the pre-stored code stream to perform the transcoding, and outputting the code stream matching the bandwidth of the user terminal to the user terminal; and if no, selecting the code stream of which the code rate is the highest among those lower than or equal to the bandwidth of the user terminal from the pre-stored code stream, and outputting to the user terminal.

In which, judging whether a transcoding is required varies according to different situations of the bandwidth of the user terminal and the pre-stored code stream, for example:

judging that the transcoding is required when a plurality of code streams are pre-stored and the bandwidth of the user terminal reaches a certain threshold, otherwise the transcoding is not required; wherein the threshold may be fixed, or adjusted through a user configuration parameter; or, judging that the transcoding is required when only one code stream is pre-stored and the code rate is higher than the current bandwidth of the user terminal; while judging that the transcoding is not required when only one code stream is pre-stored and the code rate is lower than or equal to the current bandwidth of the user terminal;

in addition, judging whether the transcoding is required can also be made by combining other information, such as factors like the current streaming media processing resource (e.g., transcoding processing resource), the user terminal performance parameter (e.g., computing capability) and the user network performance parameter (e.g., packet loss rate and time delay).

The current bandwidth of the user terminal may be obtained by detecting the bandwidth of the user terminal in real time, from information configured previously, or in other manners.

In case that the code stream of which the code rate is higher than the current bandwidth of the user terminal is selected from the pre-stored code stream to perform the transcoding when judging whether the transcoding is required, the code stream of which the code rate is higher than the current bandwidth of the user terminal under the same resolution may be selected, e.g., a code stream of which the code rate is the highest; or the code stream of which the code rate is higher than the current bandwidth of the user terminal under different resolutions may be selected and a resolution conversion is further required so as to obtain the code stream of which the resolution is the same as that of the current bandwidth of the user terminal.

A code stream matching the bandwidth of the user terminal is output after the transcoding, herein the matching may mean that the code rate of the code stream is equal to the bandwidth of the user terminal, or a bandwidth obtained by combining the bandwidth of the user terminal with other information (e.g., current streaming media processing resource and packet loss rate). To be noted, herein "equal to" does not mean a strict equivalence. Even if a certain error exists between the actual output and the bandwidth of the user terminal in the processing or transmission by the communication device, it may be deemed as equivalence, and a certain error may also exist for the equivalence under other situations.

Whether to perform the transcoding is judged according to the current bandwidth of the user terminal and the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiment of the present invention enables the user terminal to obtain the streaming media of higher quality by effectively utilizing the bandwidth, thereby improving the quality of the streaming media service.

Embodiment 2

Figure 4:
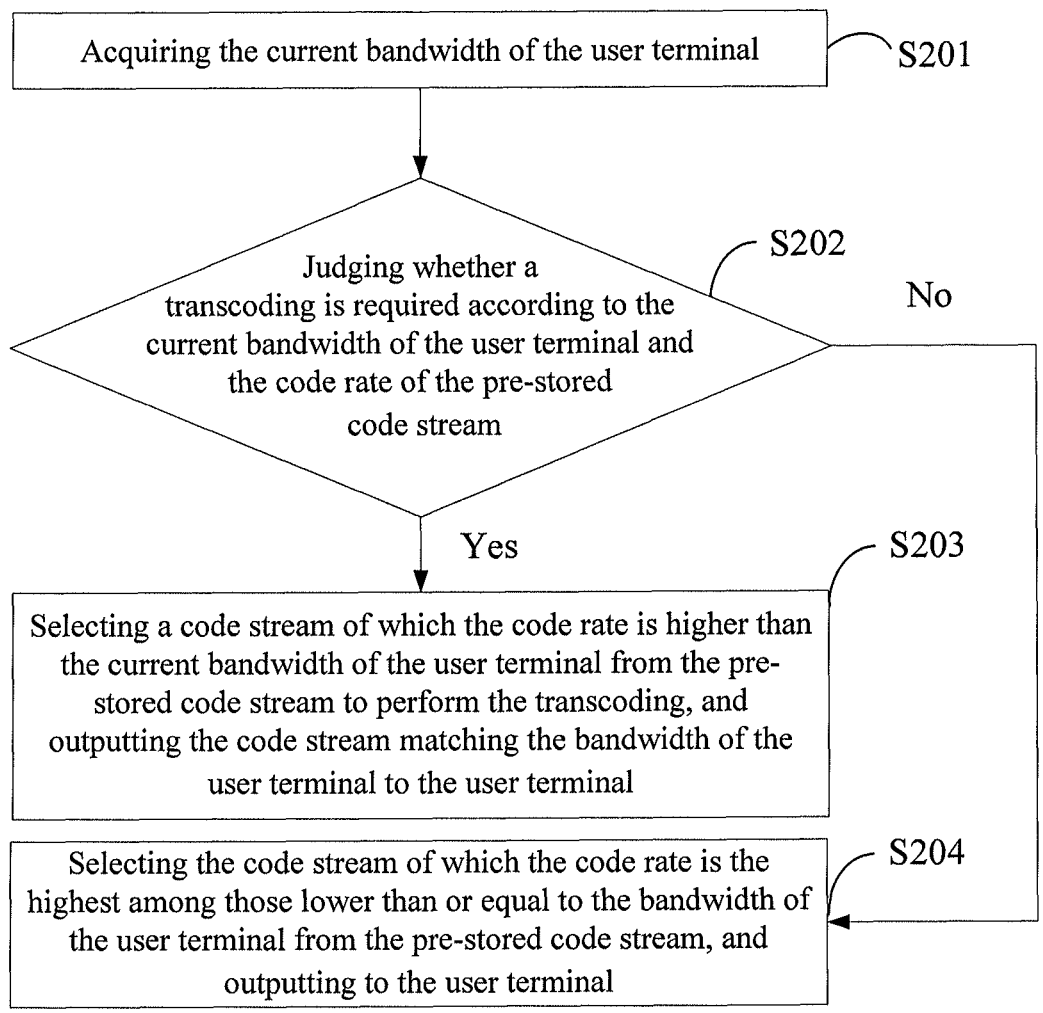
FIG. 4 is a flowchart of a streaming media processing method according to Embodiment 2 of the present invention.

The embodiment of the present invention provides a streaming media processing method. Referring to FIG. 4, the streaming media processing method includes:

S201: acquiring the current bandwidth of the user terminal;

Specifically, the current bandwidth of the user terminal may be acquired through a real time detection or information configured previously. The configured information may be obtained from a statistics of the bandwidth of the user terminal at historic moments, e.g., the bandwidth of the user terminal is large from 8:00 AM to 18:00 PM, while small from 18:00 PM to 22:00 PM.

S202: judging whether the transcoding is required according to the current bandwidth of the user terminal and a code rate of a pre-stored code stream;

The pre-stored code stream generally includes a plurality of compressed streaming media code streams (e.g., avi, rm, mp4 streaming media code streams, etc.); but it is impossible to store too many code streams due to the limitations of storage and processing capacities, and usually the number can be set as five to ten (may be adjusted appropriately according to the storage and processing capacities). In addition, the code streams are set to have different code rates with respect to the same resolution. FIG. 5 illustrates a form of the pre-stored code stream, in which code streams 1 to 2 have the resolution of **400\*200 with the highest code rate of 15 Mbps; code streams 3 to 5 have the resolution of 200\*100 with the highest code rate of 3 Mbps; and code streams 6 to 7 have the resolution of 100\*50** with the highest code rate of 0.8 Mbps.

When there are a plurality of streaming media code streams, whether the transcoding is required may be judged by judging whether a certain threshold is exceeded, and the threshold may be fixed or dynamically adjusted. In case of the fixed threshold, it is set between every two pre-stored code streams, and the transcoding is required when the threshold is exceeded, otherwise not required. As illustrated in FIG. 5, a threshold 0.6 Mbps may be set between code streams 7 and 6, and the transcoding is required when the current bandwidth of the user terminal exceeds 0.6 Mbps, otherwise the transcoding is not required. The threshold of other code streams may be set similarly.

Figure 6:
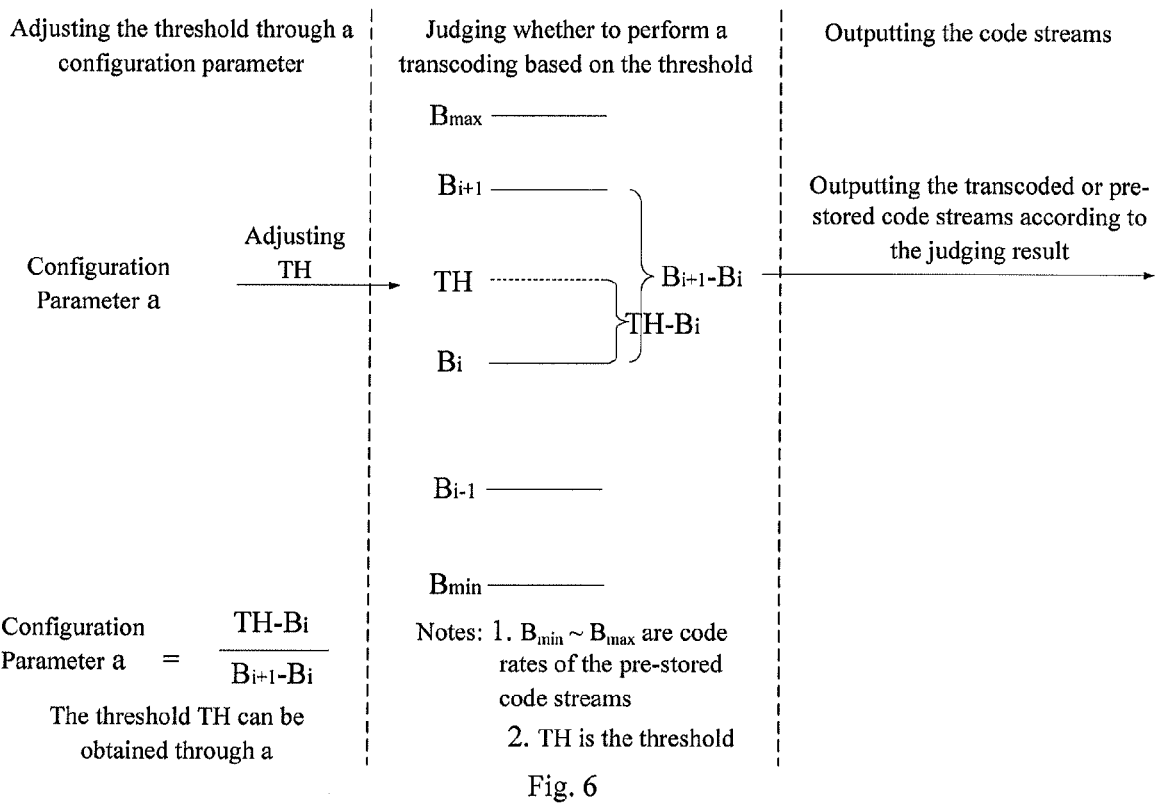
FIG. 6 is a schematic diagram of judging whether to perform a transcoding based on a threshold according to Embodiment 2 of the present invention.

More generally the user may dynamically adjust the threshold upon the actual situation. In that case, the user may dynamically adjust the threshold by adjusting a configuration parameter, and the specific adjusted parameter and algorithm are not limited. FIG. 6 illustrates a specific method for adjusting the parameter according to an embodiment of the present invention.

The configuration parameter for the adjusting method is a, which is defined as $a=(TH-Bi)/(Bi+1-Bi)$, in which $Bi$ and $Bi+1$ are code rates of two adjacent pre-stored code streams, and $Bi+1$ is larger than $Bi$ (Bmax is the code rate of the maximum code stream and Bmin is the code rate of the minimum code stream); the configuration parameter a represents the percentage of the threshold $TH-Bi$ in $Bi+1-Bi$, and has a range of [0, 1]; for example, when a is configured as ⅓, the value of TH can be calculated through the definition of a, and the transcoding is required once TH is exceeded, otherwise the transcoding is not required. To be noted, the definition of the configuration parameter a is just a simple and specific definition, and during the practical application, the threshold may also be set with a configuration parameter of other definition, which is not limited herein.

When there is only one code stream is stored, it is judged that the transcoding is required in case the code rate of the code stream is higher than the current bandwidth of the user terminal; on the contrary, it is judged that the transcoding is not required in case the code rate of the code stream is lower than or equal to the current bandwidth of the user terminal.

In addition to judging whether the transcoding is required according to the current bandwidth of the user terminal and the pre-stored code stream, whether to perform the transcoding or adjust the relevant threshold may be judged by combining one or more of the factors such as the streaming media processing resource (e.g., transcoding processing resource), the user terminal performance parameter (e.g., computing capability) and the user network performance parameter (e.g., packet loss rate and time delay). For example, when the streaming media transcoding capability is strong while a few streams to be processed, it means that the streaming media processing resource is sufficient. In that case, as exemplarily illustrated in FIG. 6, the corresponding threshold may be decreased, i.e., the transcoding may be performed once TH slightly exceeds Bi. On the contrary, when the streaming media transcoding capability is weak while many streams to be processed, it means that the streaming media processing resource is insufficient. In that case, the corresponding threshold may be increased, or the transcoding may not be performed. Similarly, whether to perform the transcoding or adjust the relevant threshold may be judged according to various system parameters such as the user terminal performance parameter and the user network performance parameter (e.g., packet loss rate). For example, in case the packet loss rate of the user terminal is high, the threshold may be adjusted to be a little higher, or the transcoding may not be performed. On the contrary, in case the packet loss rate is low, the threshold may be adjusted to be a little lower.

S203: if yes, selecting the code stream of which the code rate is higher than the current bandwidth of the user terminal from the pre-stored code stream to perform the transcoding, and outputting the code stream matching the current bandwidth of the user terminal to the user terminal;

when the transcoding is judged to be required, selecting the code stream of which the code rate is higher than the current bandwidth of the user terminal from the pre-stored code stream to perform the transcoding (selecting the code stream of which the code rate is lower than or equal to the current bandwidth of the user terminal will not improve the quality of the streaming media and has no sense).

Specifically, the code stream of which the code rate is the highest under the current resolution may be selected to perform the transcoding. For example, as illustrated in FIG. 5, it is assumed that the resolution of the current code stream of the user terminal is **200\*100** and the code rate is 1.5 Mbps, the transcoding is performed when the code rate is judged as exceeding a threshold (e.g., 2 Mbps). In that case, the code stream of which the code rate is the highest under the resolution (e.g., a code stream of 3 Mbps herein) is selected to perform the transcoding.

Herein a code stream of which the code rate is not the highest under the resolution (e.g., a code stream of 1.5 Mbps herein) may also be selected to perform the transcoding.

In addition, a code stream not under the current resolution may also be selected to perform the transcoding, but the resolution shall be converted during the transcoding.

The code stream matching the bandwidth of the user terminal is output after the transcoding. Herein the matching may mean that the code rate of the code stream is equal to the bandwidth of the user terminal, or a bandwidth obtained by combining the bandwidth of the user terminal with other information (e.g., streaming media processing resource, user terminal performance parameter and user network performance parameter). For example, if the obtained current bandwidth of the user terminal is 2M, while the user network performance parameter is relatively poor (e.g., the packet loss rate is relatively high), a code stream of 1.9 Mbps or 1.8 Mbps may be output to the user terminal. To be noted, herein "equal to" does not mean a strict equivalence. Even if a certain error exists between the actual output and the bandwidth of the user terminal in the processing or transmission by the communication device, it may be deemed as equivalence, and a certain error may also exist for the equivalence under other situations.

S204: if no, selecting the code stream of which the code rate is the highest among those lower than or equal to the bandwidth of the user terminal from the pre-stored code stream, and outputting to the user terminal.

For example, as illustrated in FIG. 5, it is assumed that the bandwidth of the user terminal is 1.7 Mbps and the transcoding threshold is 2 Mbps, since the bandwidth of the user terminal is lower than the transcoding threshold, the transcoding cannot be performed. In that case, the code stream of which the code rate is the highest among those lower than or equal to the bandwidth of the user terminal (herein the code stream of 1.5 Mbps) is selected and output to the user terminal, so as to maximally ensure the quality of the streaming media.

To be noted, the concrete time of the judgment is not limited, but the switching shall be carried out in a basic unit of time slice, i.e., the switching to the slice of another code stream cannot be made until the time slice of the current code stream is ended. Different time slices in the same code stream may have different lengths, but the time slices of the same order in different code streams must have the same length, otherwise the time will not be corresponding during the code stream switching. As illustrated in FIG. 5, the time slices 11, 12, 13 and 14 or 21, 22, 23 and 24 may have different lengths, but the time slices 11, 21, 31 . . . 71 or 13, 23, 33 . . . 73 must have the same length.

Whether to perform the transcoding is judged according to the current bandwidth of the user terminal and the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiment of the present invention enables the user terminal to obtain the streaming media of higher quality by effectively utilizing the bandwidth.

Whether to perform the transcoding is judged according to the current bandwidth of the user terminal and the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiment of the present invention enables the user terminal to obtain the streaming media of higher quality by effectively utilizing the bandwidth, thereby improving the quality of the streaming media service.

Embodiment 3

Figure 7:
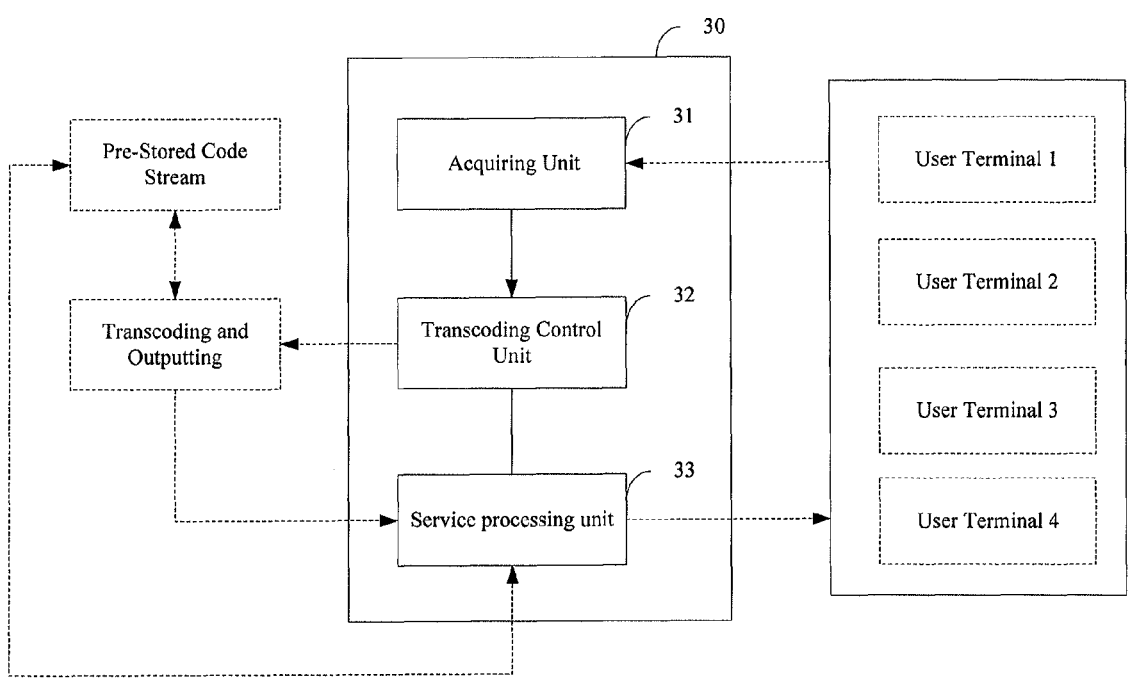
FIG. 7 is a structural diagram of a streaming media processing device according to Embodiment 3 of the present invention.

The embodiment of the present invention provides a streaming media processing device 30. As illustrated in FIG. 7, the streaming media processing device 30 includes:

an acquiring unit 31 configured to acquire the current bandwidth of a user terminal;

a transcoding control unit 32 configured to judge whether the transcoding is required according to the current bandwidth of the user terminal and a code rate of a pre-stored code stream;

a service processing unit 33 configured to receive, when the transcoding control unit 32 judges that transcoding is required, a code stream matching the current bandwidth of the user terminal obtained by selecting the code stream of which the code rate is higher than the current bandwidth of the user terminal from the pre-stored code stream to perform the transcoding, and output to the user terminal.

When the transcoding control unit 32 judges that the transcoding is not required, selecting the code stream of which the code rate is the highest among those lower than or equal to the bandwidth of the user terminal from the pre-stored code stream, and outputting to the user terminal.

The transcoding control unit may judge whether the transcoding is required according to the following situations:

judging that the transcoding is required when a plurality of code streams are pre-stored and the current bandwidth of the user terminal reaches a certain threshold, otherwise the transcoding is not required; wherein the threshold may be fixed, or adjusted through a configuration parameter; the form of the configuration parameter and the specific algorithm may be adjusted upon the actual situation, and herein are not limited;

or, judging that the transcoding is required when only one code stream is pre-stored and the code rate is higher than the current bandwidth of the user terminal; while judging that the transcoding is not required when only one code stream is pre-stored and the code rate is lower than or equal to the current bandwidth of the user terminal;

or, judging whether the transcoding is required according to the bandwidth of the user terminal and the pre-stored code stream in combination with one or more of the streaming media processing resource, the user terminal performance parameter and the user network performance parameter. For example, when the streaming media processing resource is relatively few, the threshold may be adjusted to be a litter larger or the transcoding may not be performed. Similarly, when the packet loss rate is relatively high, the threshold may be adjusted to be a little larger or the transcoding may not be performed, and when the packet loss rate is relatively low, the threshold may be adjusted to be a litter smaller.

Figure 8:
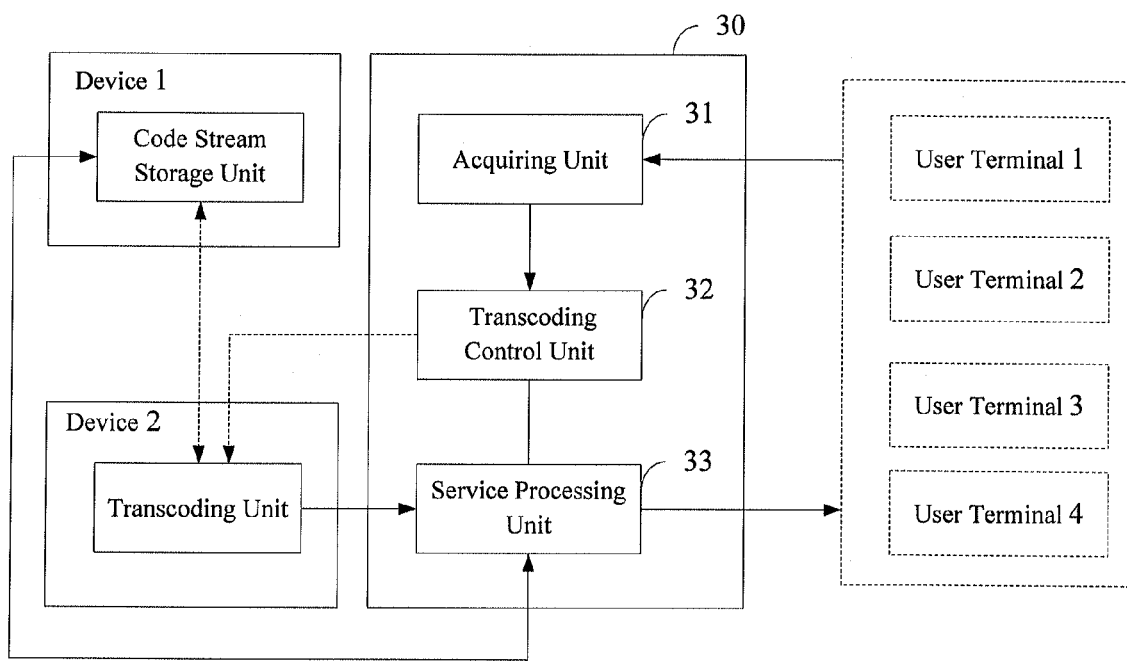
FIG. 8 is another structural diagram of a streaming media processing device according to Embodiment 3 of the present invention.
Figure 9:
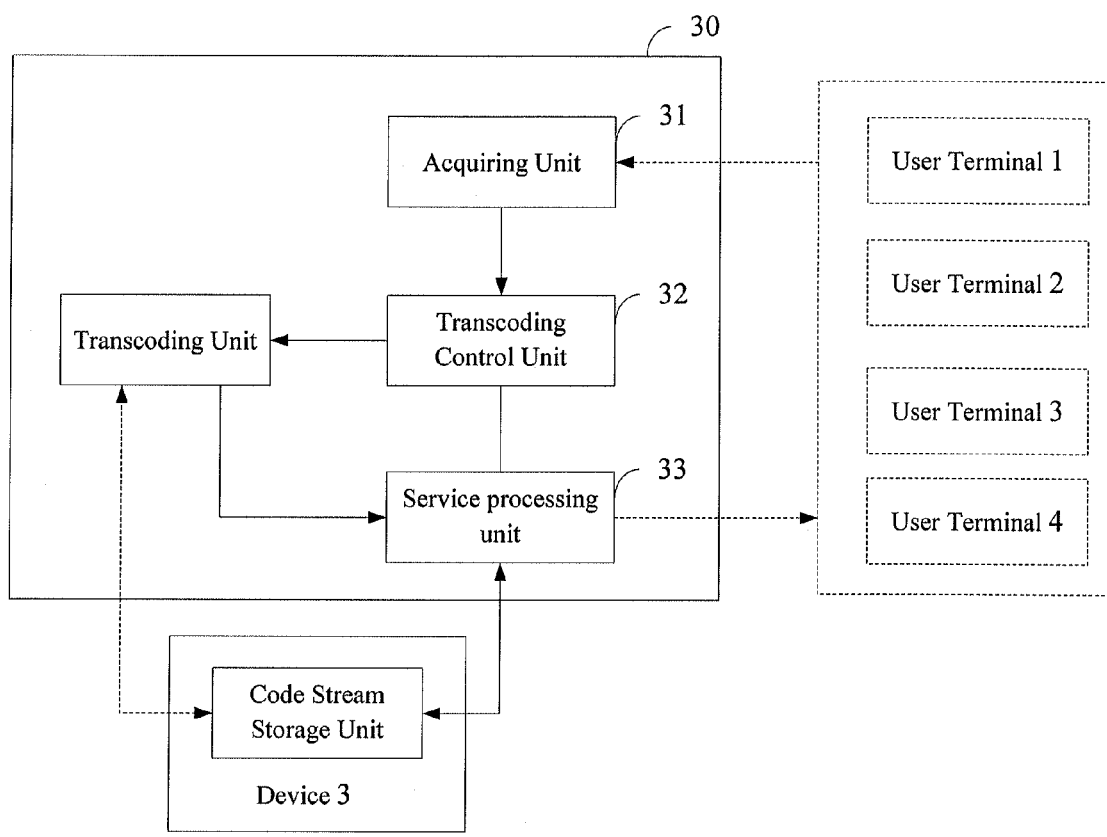
FIG. 9 is another structural diagram of a streaming media processing device according to Embodiment 3 of the present invention.

In the embodiment of the present invention, the device or unit (e.g., transcoding unit) for performing the transcoding and the device or unit (e.g., code stream storage unit) for pre-storing the code stream may be located in the device according to the embodiment of the present invention, or implemented through other devices. Referring to FIG. 8, which is a structural diagram in which the transcoding unit is not located in the device according to the embodiment of the present invention. Referring to FIG. 9, which is a structural diagram in which the device according to the embodiment of the present invention includes the transcoding unit. The code stream storage unit may be arranged similarly, as illustrated in FIGS. 8 and 9, the code stream storage unit is not located in the device according to the embodiment of the present invention. In the actual application, the device according to the embodiment of the present invention may also include the code stream storage unit.

The above units may be implemented through various hardware processing units, such as processing chips, dedicated hardware processing chips and other hardware circuits with the similar function, wherein one functional unit may be implemented with one or more hardware processing units, meanwhile, one hardware processing unit may also implement one or more functional units, which is not limited herein. The operation flows of respective units may refer to relevant steps in Embodiment 2, and herein are omitted.

Specifically, the streaming media processing device according to the embodiment of the present invention may be a streaming media server, a media gateway, a media resource server, etc.

Whether to perform the transcoding is judged according to the current bandwidth of the user terminal and the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiment of the present invention enables the user terminal to obtain the streaming media of higher quality by effectively utilizing the bandwidth, thereby improving the quality of the streaming media service.

Embodiment 4

Figure 10:
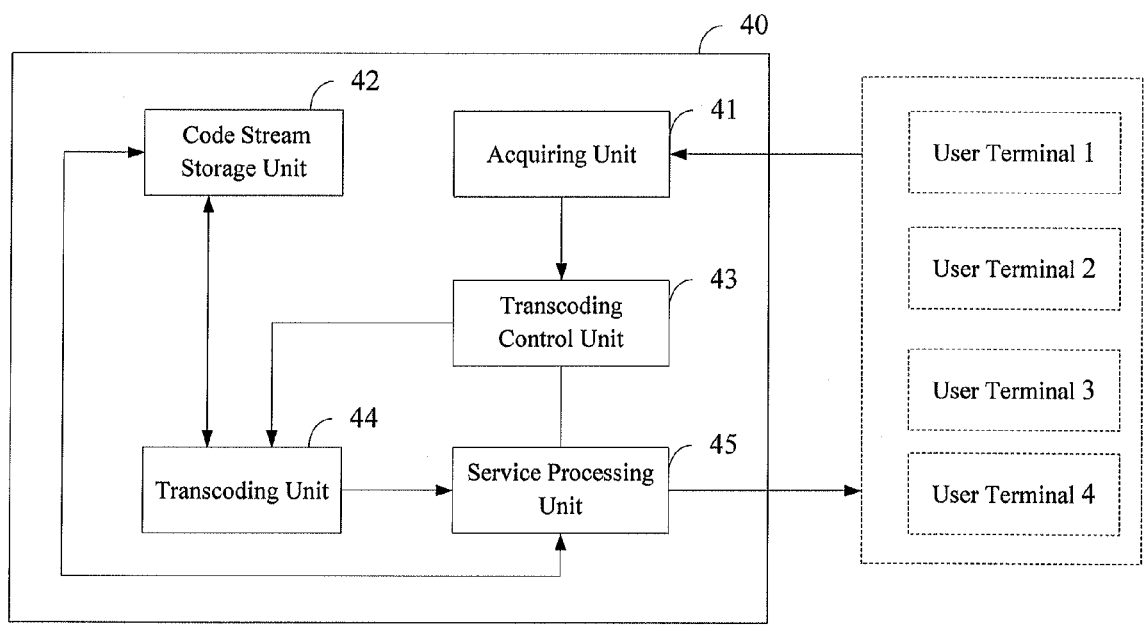
FIG. 10 is a structural diagram of a streaming media processing system according to Embodiment 4 of the present invention.

The embodiment of the present invention provides a streaming media processing system 40. As illustrated in FIG. 10, the streaming media processing system 40 includes:

an acquiring unit 41 configured to acquire the current bandwidth of a user terminal;

a code stream storage unit 42 configured to store a code stream of streaming media;

a transcoding control unit 43 configured to judge whether the transcoding is required according to the current bandwidth of the user terminal and a code rate of the code stream pre-stored by the code stream storage unit 42;

a transcoding unit 44 configured to select, when the transcoding control unit judges that the transcoding is required, a code stream of which the code rate is higher than the current bandwidth of the user terminal from the pre-stored code stream to perform the transcoding, and output the code stream matching the current bandwidth of the user terminal;

a service processing unit 45 configured to output the code stream output from the transcoding unit to the user terminal.

The service processing unit is further configured to select, when the transcoding control unit judges that the transcoding is not required, the code stream of which the code rate is the highest among those lower than or equal to the bandwidth of the user terminal from the pre-stored code stream, and output to the user terminal.

The transcoding control unit judging whether the transcoding is required according to the current bandwidth of the user terminal and the code rate of the code stream pre-stored by the code stream storage unit includes:

judging that the transcoding is required when a plurality of code streams are pre-stored and the current bandwidth of the user terminal reaches a certain threshold, otherwise the transcoding is not required; wherein the threshold may be fixed, or adjusted through a configuration parameter;

or judging that the transcoding is required when only one code stream is pre-stored and the code rate is higher than the current bandwidth of the user terminal; while judging that the transcoding is not required when only one code stream is pre-stored and the code rate is lower than or equal to the current bandwidth of the user terminal;

or, judging whether the transcoding is required according to the bandwidth of the user terminal and the pre-stored code stream in combination with one or more of the streaming media processing resource, the user terminal performance parameter and the user network performance parameter.

The above units may be implemented through various hardware processing units, such as processing chips, dedicated hardware processing chips and other hardware circuits with the similar function, wherein one functional unit may be implemented with one or more hardware processing units, meanwhile, one hardware processing unit may also implement one or more functional units, which is not limited herein. The operation flows of respective units may refer to relevant steps in Embodiment 2, and herein are omitted.

Figure 11:
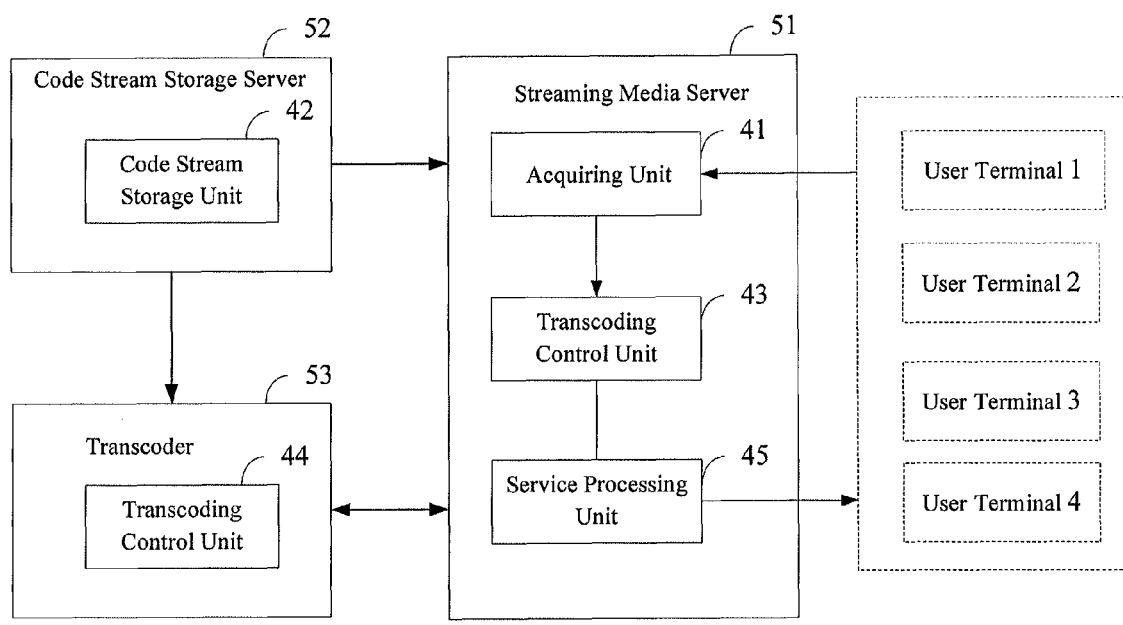
FIG. 11 is a structural diagram of an implementation of the streaming media processing system according to Embodiment 4 of the present invention.

Referring to FIG. 11, which is a schematic diagram of a concrete application where the above units are implemented through different devices.

As illustrated in FIG. 11, a streaming media processing system according to the embodiment of the present invention includes a streaming media server 51, a transcoder 52 and a code stream storage server 53;

In which, the streaming media server 51 includes the acquiring unit 41, the transcoding control unit 43 and the service processing unit 45; the transcoder includes the transcoding unit 44; and the code stream storage server 53 includes the code stream storage unit 42.

Figure 12:
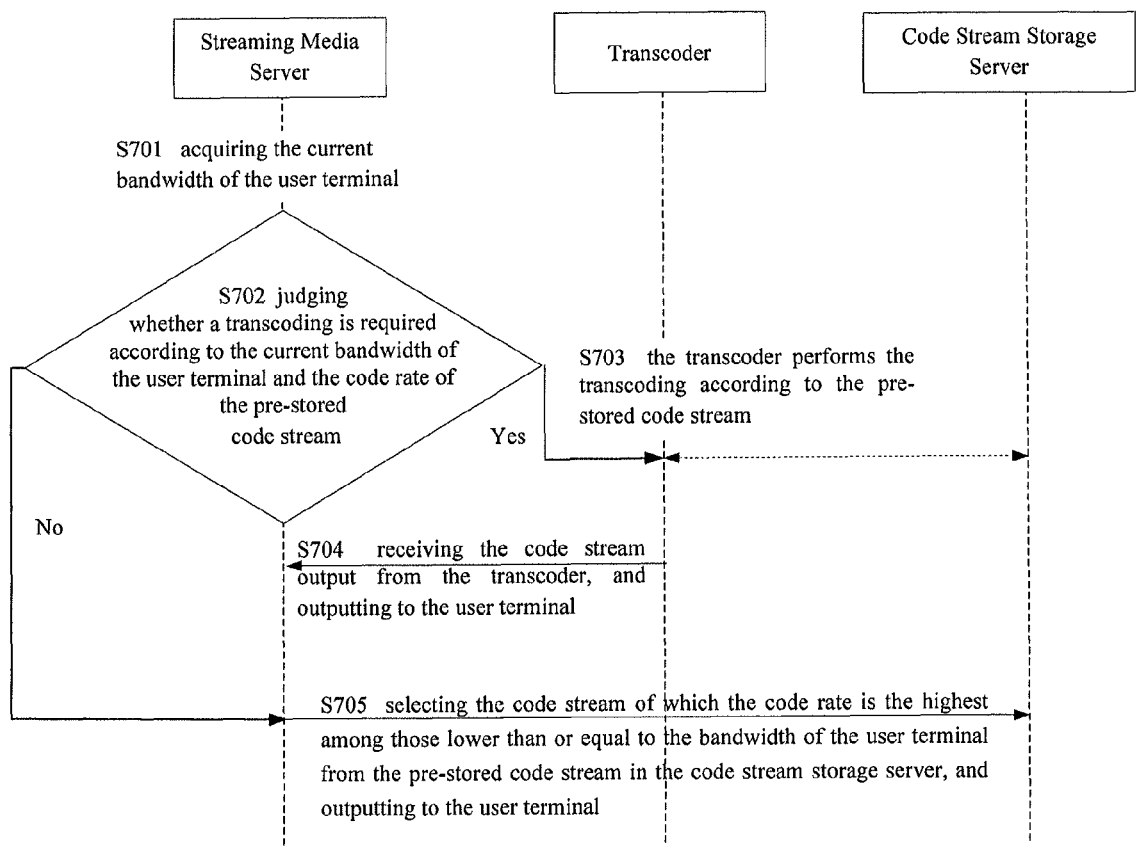
FIG. 12 is a flowchart of a streaming media processing based on the system as illustrated in FIG. 11 according to an embodiment of the present invention.

Referring to FIG. 12, which is a flowchart of a streaming media processing based on the streaming media processing system as illustrated in FIG. 11, including:

S701: the streaming media server 51 acquirs the current bandwidth of the user terminal;

specifically, the current bandwidth of the user terminal may be acquired through the acquiring unit 41;

S702: the streaming media server 51 judges whether a transcoding is required according to the current bandwidth of the user terminal and the code rate of the pre-stored code stream; if yes, performing steps S703 and S704; and if no, performing step S705;

specifically, whether the transcoding is required may be judged with the transcoding control unit; and the transcoding judgment conditions may refer to those in relevant embodiments, and herein are omitted;

S703: if yes, the transcoder 52 performs the transcoding;

specifically, the transcoder 52 may perform the transcoding with the transcoding unit, by selecting a code stream of which the code rate is higher than the current bandwidth of the user terminal from the pre-stored code stream to perform the transcoding, and outputting the code stream matching the current bandwidth of the user terminal; wherein the code stream storage server 53 includes the code stream storage unit 42;

S704: the streaming media server 51 receives the code stream output from the transcoder 52, and outputs it to the user terminal;

specifically, the streaming media server can receive the code stream output from the transcoder through the service processing unit, then perform a service processing and output to the user terminal;

S705: if no, selecting the code stream of which the code rate is the highest among those lower than or equal to the bandwidth of the user terminal from the pre-stored code stream in the code stream storage server 53, and outputting to the user terminal.

To be noted, the above embodiment is just an specific implementation, and during practical application, the streaming media server may also be a media gateway, a media resource server, etc. The above transcoder or code stream storage server may be independent, or a functional module of the media gateway, the streaming media server, etc., and the implementation is not limited.

Whether to perform the transcoding is judged according to the current bandwidth of the user terminal and the pre-stored code stream, and if yes, the code stream, of which the code rate is higher than the current bandwidth of the user terminal, is selected from the pre-stored code stream to perform the transcoding and the code stream matching the current bandwidth of the user terminal is outputted, in this way, the embodiment of the present invention enables the user terminal to obtain the streaming media of higher quality by effectively utilizing the bandwidth, thereby improving the quality of the streaming media service.

A person skilled in the art shall appreciate that all or a part of flows in the methods according to the above embodiments may be implemented by instructing relevant hardware through a program that may be stored in a computer readable storage medium, and when being executed, the program what is claimed is:

1. A streaming media processing method, comprising:
 judging whether a transcoding is required according to a current bandwidth of a user terminal and a code rate of a plurality of pre-stored code streams; and
 if yes, selecting a code stream of which the code rate is higher than the current bandwidth of the user terminal from the plurality of pre-stored code streams to perform the transcoding, and outputting the selected code stream which matches the current bandwidth of the user terminal to the user terminal;
 wherein the judging of whether the transcoding is required according to the current bandwidth of the user terminal and the code rate of the plurality of pre-stored code streams comprising:
 judging that the transcoding is indeed required when the plurality of code streams are pre-stored and the current bandwidth of the user terminal reaches a threshold, wherein the threshold is adjusted through a configuration parameter, which is defined as $a=(TH-B_i)/(B_{i+1}-B_i)$, in which TH is the threshold $B_i$ and $B_{i+1}$ are code rates of two adjacent pre-stored code streams and $B_{i+1}$ is larger than $B_i$; otherwise the transcoding is not required.

2. The streaming media processing method according to claim 1, wherein:
 if no, selecting the code stream of which the code rate is the highest among those lower than or equal to the bandwidth of the user terminal from the plurality of pre-stored code streams, and outputting to the user terminal.

3. A streaming media processing device, comprising:
 an acquiring unit configured to acquire a current bandwidth of a user terminal;
 a transcoding control unit configured to judge whether a transcoding is required according to the current bandwidth of the user terminal and a code rate of a plurality of pre-stored code streams; and
 a service processing unit configured to receive, when the transcoding control unit judges that the transcoding is required, a code stream which matches the current bandwidth of the user terminal is obtained by selecting from the plurality of pre-stored code streams of which the code rate is higher than the current bandwidth of the user terminal from the plurality of pre-stored code streams to perform the transcoding, and output to the user terminal;
 wherein the transcoding control unit judges whether the transcoding is required according to the current bandwidth of the user terminal and the code rate of the plurality of pre-stored code streams comprising:
 judging that the transcoding is indeed required when the plurality of code streams are pre-stored and the current bandwidth of the user terminal reaches a certain threshold, wherein the threshold is adjusted through a configuration parameter, which is defined as $a=(TH-B_i)/(B_{i+1}-B_i)$, in which TH is the threshold $B_i$ and $B_{i+1}$ are code rates of two adjacent pre-stored code streams and $B_{i+1}$ is larger than $B_i$; otherwise the transcoding is not required.

4. The streaming media processing device according to claim 3, further comprising:
 when the transcoding control unit judges that the transcoding is not required, the selected code stream of which the code rate is the highest among those lower than or equal to the bandwidth of the user terminal is selected from the plurality of pre-stored code streams, and output to the user terminal.

5. A streaming media processing system, comprising:
 an acquiring unit configured to acquire the current bandwidth of a user terminal;
 a code stream storage unit configured to store a plurality of code streams of streamingmedia;
 a transcoding control unit configured to judge whether a transcoding is required according to the current bandwidth of the user terminal and a code rate of the plurality of code streams pre-stored by the code stream storage unit;
 a transcoding unit configured to select, when the transcoding control unit judges that the transcoding is required, a code stream of which the code rate is higher than the currentbandwidth of the user terminal from the plurality of pre-stored code streams to perform the transcoding, and output the selected code stream which matches the current bandwidth of the user terminal; and
 a service processing unit configured to output the selected code stream output from the transcoding unit to the user terminal;
 wherein the transcoding control unit judges whether the transcoding is indeed required according to the current bandwidth of the user terminal and the code rate of the plurality of code streams pre-stored by the code stream storage unit comprising:
 judging that the transcoding is required when the plurality of code streams are pre-stored and the current bandwidth of the user terminal reaches a certain threshold, wherein the threshold is adjusted through a configuration parameter, which is defined as $a=(TH-B_i)/(B_{i+1}-B_i)$, in which TH is the threshold $B_i$ and $B_{i+1}$ are code rates of two adjacent pre-stored code streams and $B_{i+1}$ is larger than $B_i$; otherwise the transcoding is not required.

6. The streaming media system according to claim 5, wherein
 the service processing unit is further configured to select, when the transcoding control unit judges that the transcoding is not required, the selected code stream of which the code rate is the highest among those lower than or equal to the current bandwidth of the user terminal from the plurality of pre-stored code streams, and output to the user terminal.

* * * * *